May 1, 1923.
T. DE YOUNG, JR
1,453,923
BULB PLANTER
Filed March 6, 1922
3 Sheets-Sheet 1
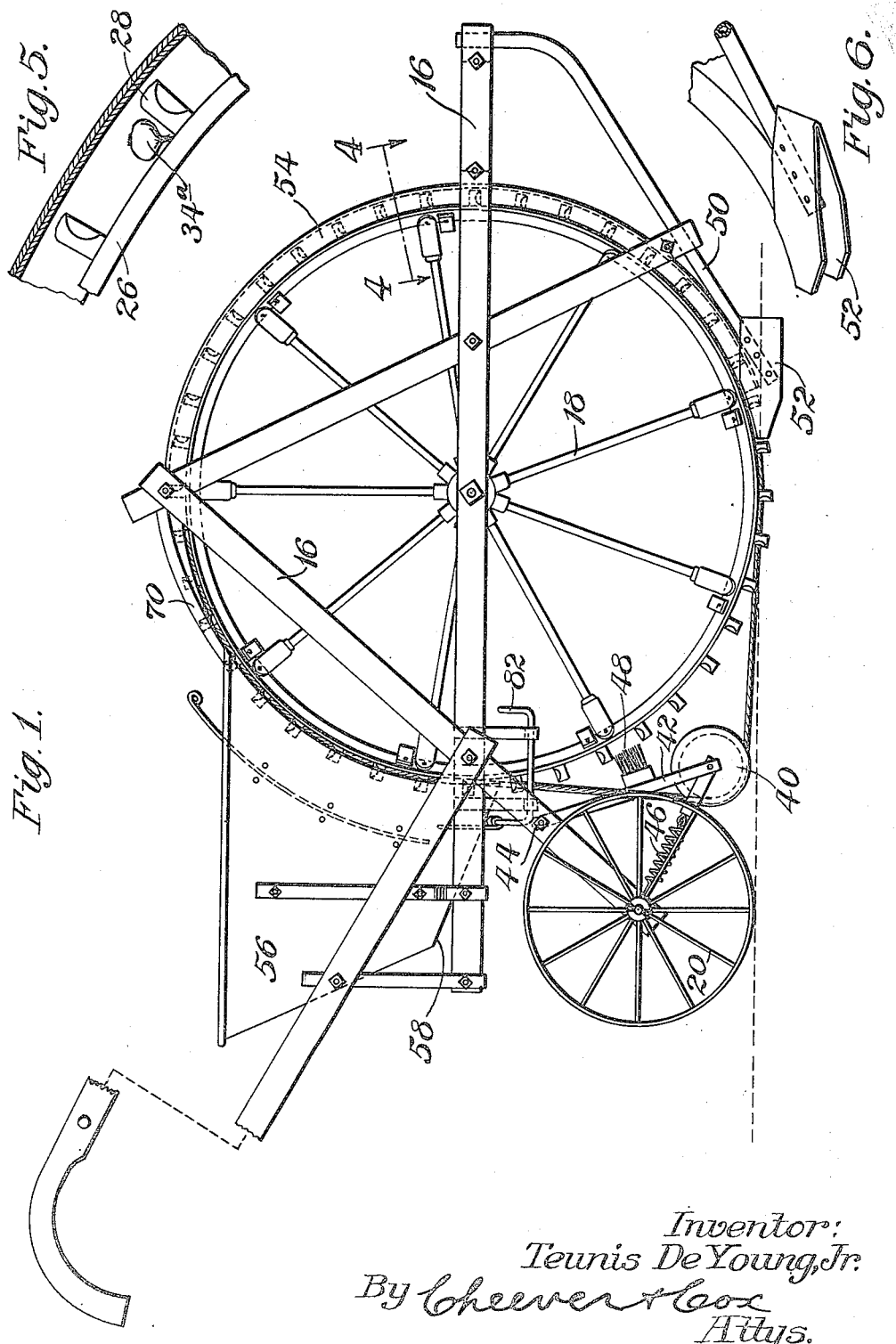
Inventor:
Teunis DeYoung, Jr.
By Cheever + Cox
Attys.

May 1, 1923.
T. DE YOUNG, JR
1,453,923
BULB PLANTER
Filed March 6, 1922
3 Sheets-Sheet 2
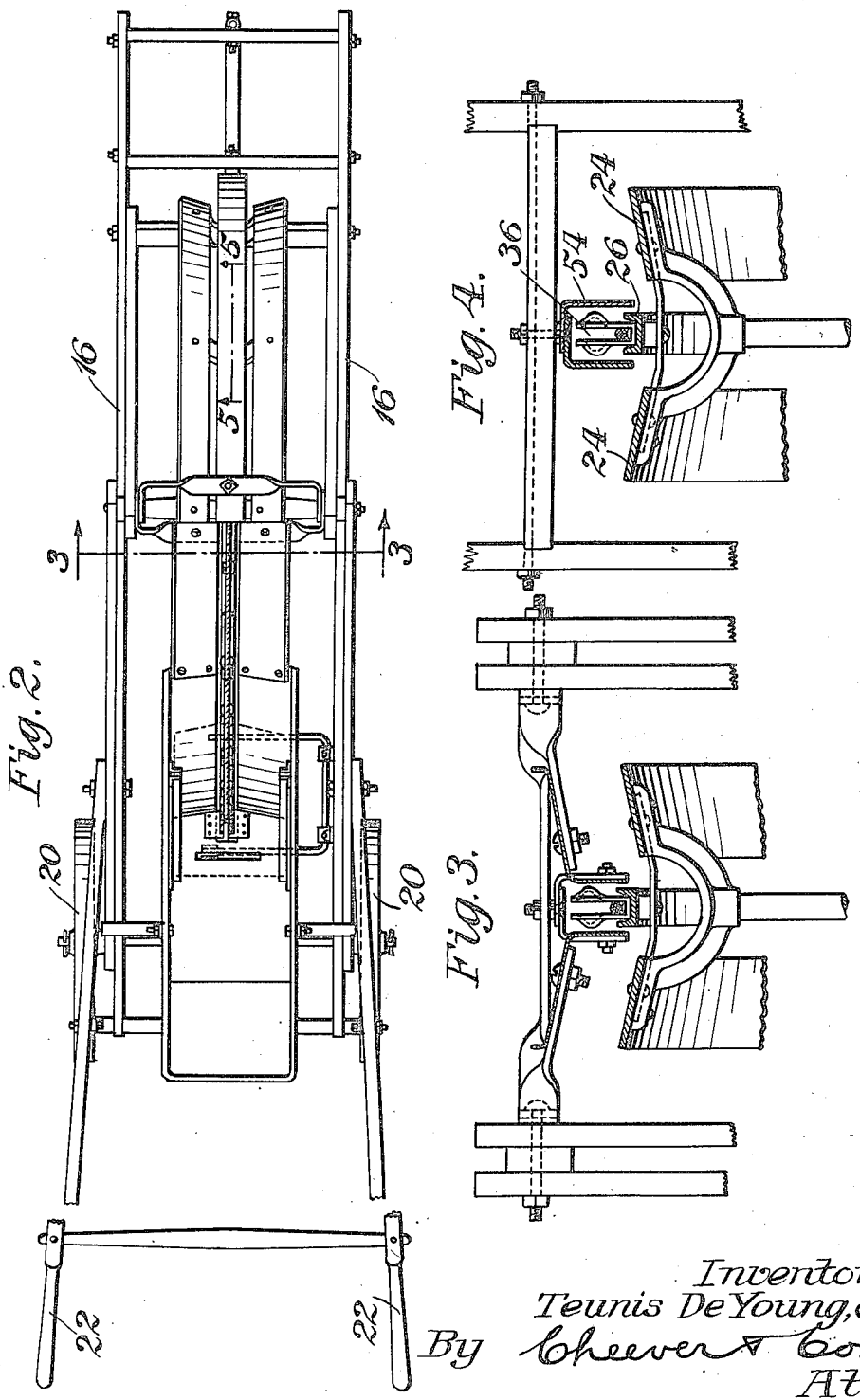

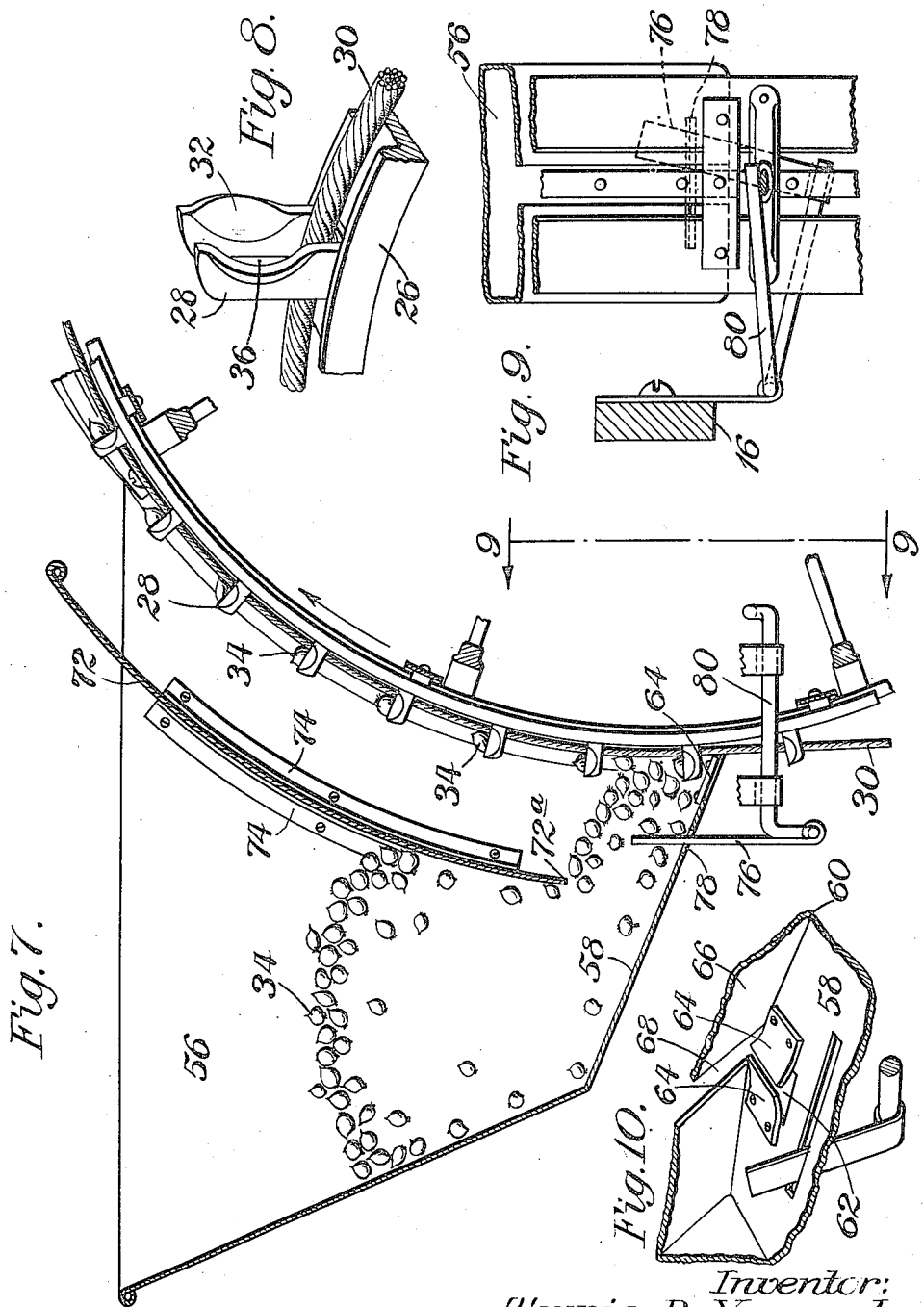

Patented May 1, 1923.

1,453,923

UNITED STATES PATENT OFFICE.

TEUNIS DE YOUNG, JR., OF SOUTH HOLLAND, ILLINOIS.

BULB PLANTER.

Application filed March 6, 1922. Serial No. 541,537.

*To all whom it may concern:*

Be it known that I, TEUNIS DE YOUNG, Jr., a citizen of the United States, residing at South Holland, in the county of Cook and State of Illinois, have invented a certain new and useful Improvement in Bulb Planters, of which the following is a specification.

This invention is a bulb, more specifically an onion, planter.

The object of the invention is to provide a machine which may be loaded up with a quantity of bulbs to be planted, to be propelled across a properly prepared field, and in its course of travel to plant the bulbs one after the other at predetermined distances apart in a suitable row.

The invention consists in a machine easily and comparatively cheaply constructible, capable of attaining the foregoing objects in a thoroughly efficient manner. The invention more particularly consists in many features and details of construction which will be hereafter more fully set forth in the specification and claims.

Referring to the drawings, in which like numerals designate the same parts throughout the several views—

Figure 1 is a side elevation of mechanism illustrating this invention in its preferred form;

Figure 2 is a plan view of the device of Figure 1;

Figure 3 is an end detail view on the line 3—3 of Figure 2;

Figure 4 is a plan detail view on the line 4—4 of Figure 1;

Figure 5 is a side detail view on the line 5—5 of Figure 2;

Figure 6 is a perspective view of the furrow opener or plow;

Figure 7 is a vertical sectional detail view through the bulb storage chamber and the cooperating part of the carrier mechanism;

Figure 8 is a perspective view of a bulb carrier;

Figure 9 is a detail rear view taken on the line 9—9 of Figure 7; and

Figure 10 is a perspective view looking into the lower front corner of the bulb storage receptacle.

The particular embodiment of the invention here illustrated is mounted within a rectangular frame 16 supported on the ground at three points by a main operating wheel 18 and two supplemental wheels 20 and is pushable over the ground by conventional, manually engageable handles 22 extending to the rear of the device.

The wheel 18 is located in the central longitudinal axis of the entire mechanism, and its rim is made up of two laterally extending flanges 24 suitably sustaining between them a central channel shaped rim 26 carrying at suitable circumferentially spaced intervals bulb holders 28.

These bulb holders are, as clearly shown in Figure 8, made up of two separated radially extending arms adapted to receive between them the rope 30, each arm being preferably provided with suitable recesses or depressions 32 making together a sort of cup in which the bulbs 34 may rest and be retained as clearly shown in Figure 7. The recess or space 36 between the arms of the bulb holder 28 is of sufficient depth so that the rope 30 may, except as hereafter noted, contact the rim member 26 without interfering with the bulb 34 in place in the cup recesses 32.

Rope 30 is made in one continuous piece of as nearly non-stretchable material as possible, usually at present of steel wire. This rope passes entirely around the wheel 18 and a supplemental wheel 40 so located that it holds the rope off from the circumference of the wheel 18 in the lower left hand quarter of the wheel, as shown in Figure 1. This wheel 40 is carried by a swinging arm 42 pivoted to the main frame at 44 and is retracted away from the main wheel 18 by a suitable spring as 46, to tighten the rope. This lever 42 also carries a brush 48 adapted to engage passing bulb carriers 28 and remove adhering dirt therefrom. Suitably supported from the front portion of the frame 16, as for instance by the rod 50, is a furrow opening plow 52 so positioned that as the machine moves to the right, as viewed in Figures 1 and 2, a suitable furrow is made in the ground so that a bulb carried by an adjacent passing bulb carrier 28 may drop into this furrow in advance of the wheel 18, and as that wheel actually passes over it, be covered up by the pressing action of the inclined wheel flanges 24.

The forward or right hand half of the wheel 18, as viewed in Figure 1, is encircled by a bulb enclosing case 54 made for instance of angle irons, as shown in Figure 4, and suitably proportioned to retain a bulb 34 positioned as shown at 34ᵃ, Figure 5, on the wheel rim 26 as it passes from the top of the wheel down into the furrow made by plow 52.

As the rear or left hand side of the wheel 18, as viewed in Figure 1, there is a bulb storage receptacle 56 having a downwardly inclined bottom member 58 so closely approaching the circumference of the wheel at the angular point 60 that a slot 62 must be provided for the passage of the rope 30 and the bulb carriers 28 into the receptacle, this slot being closed by automatically self closing doors 64 arranged on opposite sides thereof. In the particular case here illustrated, these doors are nothing but leather flaps.

The forward wall of the receptacle 56 is made up of two curved plates 66, conforming to the circumference of the wheel 18, separated from each other in an elongated slot 68 registering with slot 62 heretofore referred to and of such a size and shape as to permit the upward passage of the rope 30 and the bulb carriers 28 through the receptacle 56 without its being possible for the bulbs in the receptacle to escape through the slot 68 except by being carried as shown in Figure 7 on the passing bulb carriers 28.

Suitably attached to the upper ends of the wall members 66 of the receptacle 56 are vertically disposed bulb guides 70 adapted to prevent a bulb carried by a bulb carrier from the upper edge of receptacle 56 to the upper entrance of case 54, from falling out of the carrier 28 to the side of the wheel.

The bulb storage receptacle 56 is provided with a vertically slidable partition 72 movable between suitable wall flanges 74 to so position its lower end 72ᵃ as to control the flow of bulbs 34 from the main body of the receptacle 56 down to the bulb carriers 28 passing upward through slot 62.

In order to prevent bulbs 34 traveling from the main part of receptacle 56 to the passing carriers as just described from becoming blocked on the lower part of inclined wall 56 adjacent to slot 62, a vertically reciprocatable agitating rod 76 is mounted to travel through an opening 78 in the bottom member 56 of the bulb storage chamber. This member 56 may be agitated vertically by any suitable means, in the particular case here illustrated a crank mechanism 80 is employed, the same being propelled by a latch lock arm 82 successively engaged by the spokes of wheel 18 in the manner shown in Figure 9.

In the operation of the device, the mechanism is assembled, as shown in Figures 1 and 2, with a suitable quantity of bulbs 34 in chamber 56, as shown in Figure 7. The operator takes hold of the handles 22, pushes the entire device to the right, as viewed in Figure 1, over the properly prepared ground. This movement by the operator causes wheel 18 to rotate in a clockwise direction.

Starting for purposes of description with one bulb carrier 28 at, say, just above brush 48, the rotation of wheel 18 causes this particular bulb carrier to pass through slot 62 past doors 64 into bulb chamber 56, where one of the several adjacent bulbs finally settles itself in carrying position on the carrier 28, as shown in Figure 7. The bulb thus located is carried through the remaining bulbs adjacent to it in the receptacle 56, up through the slot 68, between the guards 70 into the upper end of case 54, from which point the particular bulb carrier travels downwardly on the right hand side of the wall as viewed in Figure 1, inside of this case. At some point in this downward travel, before the furrow making plow 52 is reached, the bulb loosens itself and falls to the position of 34ᵃ, Figure 5, where it remains until the lower end of case 54 is reached, whereupon it drops by gravity into the furrow and the wheel passes over it, pressing it into, and more or less covering it in, the furrow as heretofore described. If for any reason the bulb sticks adjacent to the wheel rim 26, the fact that the operation of rope 30 which was behind it in its path of travel thus far described now leaves the circumference of the wheel 18 and goes to wheel 40, necessarily forcibly drives the bulb from the circumference of the wheel into the ground. During the movement from the lowest point on the wheel 18 to the wheel 40 the rope 30 is drawn entirely away from wheel 18 through the space 36 in the bulb carrier 28 to forcibly withdraw in the obvious manner from that space the dirt which necessarily contacts that particular bulb carrier as it contacts the ground at the bottom point in the path of travel of the wheel through and adjacent to the furrow as just described. If any substantial amount of dirt is left on the particular bulb carrier referred to, it is cleaned by the action of the brush 48 which it has to pass in returning to its initial position.

Each one of the bulb carriers on the wheel acts in exactly the same manner at each rotation of the wheel so that as a final result the bulbs from receptacle 56 are carried one by one into the furrow and placed at distances apart measured by the circumferential distance apart of the various bulb carriers 28 on the wheel 18.

During the rotation of the wheel 18 its spokes successively strike arm 42, thus vertically reciprocating rod 76 and stirring up the bulbs about to be delivered to the wheel. The operator can, by taking hold of the upper end of partition 72 and moving it vertically, control the supply of bulbs delivered to this agitating mechanism. By variously combining these devices, the operator has full control of the mechanism to insure a proper planting of the bulbs.

What I claim is:

1. In mechanism of the class described, a rotatable wheel having projecting from its circumference suitably spaced bulb carrying devices, a rope enclosing said wheel and entering recesses formed in each of said bulb carrying devices without interfering with bulbs carried by said devices while the rope is in contact with the circumference of the wheel, and means carrying said rope away from the circumference of said main wheel during a certain arc of its rotation, whereby as the rope leaves the circumference of the wheel it strips bulbs and dirt from the successive bulb carriers.

2. In mechanism of the class described, a wheel provided with a plurality of circumferentially arranged bulb carriers, each consisting of a pair of outwardly extending arms separated from each other and recessed on their adjacent sides to receive a bulb.

3. In mechanism of the class described, a wheel provided with a plurality of circumferentially arranged bulb carriers, each consisting of a pair of outwardly extending arms separated from each other and recessed on their adjacent sides to receive a bulb, the space between the arms being sufficient to permit a rope to pass circumferentially around the wheel between said arms and the length of the arms being such that the bulb on said carrier is not interfered with by said rope when it contacts the wheel.

4. In mechanism of the class described, a rotatable wheel equipped circumferentially with spaced apart bulb carriers recessed in the middle for the passage of a rope around the wheel through said bulb carriers, another wheel at one side of the main wheel adapted to have the rope pass over it, means for applying tension to said second wheel and a rope over both wheels, for the purposes set forth.

In witness whereof, I have hereunto subscribed my name.

TEUNIS DE YOUNG, Jr.